UNITED STATES PATENT OFFICE 2,410,890

METHOD OF PRODUCING CATALYST

Ralph Burgess Mason, Baton Rouge, La., assignor to Standard Oil Development Company, a corporation of Delaware No Drawing. Application June 15, 1944, Serial No. 540,549

1 Claim. (Cl. 252—254)

The present invention relates to the novel features hereinafter disclosed in the specification and claim.

The catalytic reduction of nitroaromatic compounds to the corresponding aromatic amines has been accomplished heretofore. One of the important problems involved in the successful commercial production of aromatic amines has to do with the provision of a suitable catalyst for the operation. I have discovered a class of catalysts which are eminently suitable for catalyzing the reduction of aromatic nitro compounds such as nitro benzene, nitro toluene, nitro xylene, etc., to form the corresponding aromatic amine. These catalysts consist of a mixture of metallic oxides partially sulfided. Preferably, the catalyst consists of a mixture of molybdenum oxide, magnesium oxide and zinc oxide, partially sulfided. Briefly, these catalysts consist of active hydrogenation catalysts admixed with the oxides of calcium or magnesium, the latter being the spacing or supporting agent. In the preferred modification of my invention I have secured excellent results with a partially sulfided mixture of molybdenum oxide, magnesium oxide and zinc oxide, and hereinafter I shall set forth data showing the superiority of the partially sulfided catalyst.

The main object of my invention, therefore, has to do with improvements in catalysts suitable for use in the reduction of aromatic nitro compounds.

Other and further objects of my invention will appear in the following more detailed description and claim.

In preparing the catalyst I proceed in a preferred modification as follows:

17 parts of MgO were mixed dry with 30 parts of ZnO and 53 parts of $MoO_3$, the parts being by weight and sufficient water was added to make a paste. The paste was dried at 250° F. and extruded to form rods say $\frac{1}{16}$ of an inch in diameter and about $\frac{1}{4}$ of an inch in length. Of course, the size of the shaped bodies may vary considerably. Instead of extruded rods, my catalyst may be in the form of lumps, granules, pellets, pills, or any convenient shape.

In order to show the value of the foregoing partially sulfided catalyst consisting of an equimolecular mixture of molybdenum oxide, magnesium oxide and zinc oxide, I made three runs in which I reduced nitro xylene, in the presence of excess hydrogen over the amount theoretically required, two (under A) in which the catalyst was partially sulfided, and in the other (under B) the catalyst was not sulfided. The operating conditions and the results are set forth in the table below:

Table 1

| Catalyst | $MoO_3.MgO.ZnO$ | | |
|---|---|---|---|
| | Sulfided (A) | | Reduced (B) |
| Method of pretreatment | Hydro | Glass tube | Glass tube. |
| Wt. percent catalyst (on feed) | 33 | 33 | 38. |
| Diluent | Xylene | Xylene | Alkylate safety fuel. |
| Volume percent diluent | 80 | 80 | 80. |
| Temperature, ° F | 450 | 425 | 450. |
| Pressure, lbs./sq. in | 2,600 | 2,600 | 2,600. |
| Wt. percent conversion of feed | 100 | 100 | 13. |

In sulfiding the catalyst, the same was treated with a stream of gas containing nitrogen and hydrogen sulfide in a glass tube. Any other convenient method of introducing sulfur into the catalyst may, of course, be used. In particular, a good method for sulfiding the catalyst is to treat the oxide mixture with the hydrogen sulfide containing gas at a temperature of about 850° to 900° F. at approximately one atmosphere pressure whereupon the catalyst acquires about 15 to 25 weight per cent sulfur. Another method is to form the sulfided catalyst in situ in the reducing zone. In the foregoing table the designation "Glass tube" means that the catalyst is sulfided in a tube outside the reactor while the term "Hydro" means that the sulfiding is accomplished in the reactor. The term "Reduced" means that the catalyst was treated with hydrogen but not with $H_2S$ or other form of sulfur.

My catalyst is adapted for use in a continuous process where the feed stock comprising a nitro aromatic passes continuously through a bed of catalyst. Thus for example, I may carry out the process in the type of apparatus shown in the application of Cecil L. Brown, U. S. Serial No. 498,695, filed August 14, 1943.

Numerous modifications of my invention will suggest themselves to those who are familiar with this art.

What I claim is:

The method of forming a catalyst suitable for promoting the reduction of nitro aromatic compounds which comprises mixing about 17 parts of MgO with 30 parts of ZnO, and 53 parts of $MoO_3$, adding sufficient water to make a paste, drying the paste at about 250° F., extruding the paste to form shaped bodies, and thereafter sulfiding the catalyst by treating it with a volatile sulfide at temperatures within the range of from 850° F. to 900° F. at one atmosphere pressure until the catalyst acquires from about 15–25 weight per cent of sulfur.

RALPH BURGESS MASON.